(12) United States Patent
Lykkegaard (10) Patent No.: US 8,333,274 B1
(45) Date of Patent: Dec. 18, 2012

(54) SORTING SYSTEM WITH LINEAR SYNCHRONOUS MOTOR DRIVE

(75) Inventor: Uffe Lykkegaard, Århus (DK)

(73) Assignee: Crisplant A/S, Arhus N (DK)

( * ) Notice: Subject to any disclaimer, the term of this patent is extended or adjusted under 35 U.S.C. 154(b) by 0 days.

(21) Appl. No.: 13/536,507

(22) Filed: Jun. 28, 2012

Related U.S. Application Data (63) Continuation of application No. 12/595,473, filed as application No. PCT/DK2008/050087 on Apr. 16, 2008, now Pat. No. 8,210,343.

(30) Foreign Application Priority Data

Apr. 16, 2007 (DK) ................................. 2007 00553
Dec. 18, 2007 (DK) ................................. 2007 01807

(51) Int. Cl.
*B65G 54/02* (2006.01)
*H02K 41/03* (2006.01)

(52) U.S. Cl. ...................................................... 198/805

(58) Field of Classification Search .................. 198/619, 198/805
See application file for complete search history.

(56) References Cited

U.S. PATENT DOCUMENTS

| | | | | |
|---|---|---|---|---|
| 4,792,036 A * | 12/1988 | Heidelberg | ..................... | 198/619 |
| 5,172,803 A * | 12/1992 | Lewin | ............................ | 198/619 |
| 5,199,548 A * | 4/1993 | Tanaka et al. | ............... | 198/502.4 |
| 5,907,200 A | 5/1999 | Chitayat | | |
| 5,947,361 A * | 9/1999 | Berger et al. | ................... | 226/92 |
| 5,977,664 A | 11/1999 | Chitayat | | |
| 6,025,658 A | 2/2000 | Kamata | | |
| 6,398,016 B1 * | 6/2002 | Maeder et al. | ........... | 198/867.13 |
| 6,595,328 B1 * | 7/2003 | Nakano et al. | ................... | 186/49 |
| 6,799,672 B2 * | 10/2004 | Wood | ....................... | 198/370.04 |
| 6,938,750 B2 * | 9/2005 | Miller et al. | ............. | 198/370.06 |
| 6,971,507 B2 * | 12/2005 | Forman | ......................... | 198/805 |
| 7,121,400 B2 * | 10/2006 | Fandella | ...................... | 198/619 |
| 7,134,396 B2 * | 11/2006 | Ramu | ............................. | 105/49 |
| 7,422,099 B2 | 9/2008 | Reguzzi | | |
| 7,597,188 B2 | 10/2009 | Volpi | | |
| 7,857,297 B2 | 12/2010 | Ong | | |

(Continued)

FOREIGN PATENT DOCUMENTS

DE 26 29 162 A2 1/1978

(Continued)

OTHER PUBLICATIONS

Beumer Maschinenfabrik GmbH & Co. KG "2D E Tray Sorter with contactless energy supply" www.beumer.com.

*Primary Examiner* — Douglas Hess
(74) *Attorney, Agent, or Firm* — Knobbe Martens Olson & Bear LLP (57) ABSTRACT

The present invention relates to a sorting system including a conveyor comprising a plurality of carts for carrying articles, in particular for sorting articles such as parcels and baggage. The conveyor has a linear synchronous motor drive system with stators arranged along a track which the carts follow. Accordingly, embodiments include an improved sorting system that provides an improved energy utilization and efficiency. Reaction elements are mounted on each of the carts. The reaction elements each comprise a number of permanent magnets arranged on a carrier plate. The magnets on reaction elements of adjacent carts are arranged to form a row of magnets with constant pitch and alternating polarity, said row having an interruption situated at a transition between adjacent carts. A maximum number of coils in the stator may thereby be active at the same time, when driving the conveyor.

21 Claims, 5 Drawing Sheets

U.S. PATENT DOCUMENTS

| | | | |
|---|---|---|---|
| 8,096,409 B2 * | 1/2012 | Wipf et al. | 198/805 |
| 8,210,343 B2 * | 7/2012 | Lykkegaard | 198/805 |
| 8,248,196 B2 * | 8/2012 | Bugiel et al. | 335/296 |
| 2004/0108185 A1 | 6/2004 | Hishinuma | |
| 2006/0011093 A1 | 1/2006 | Jensen et al. | |
| 2008/0100152 A1 | 5/2008 | Busch | |

FOREIGN PATENT DOCUMENTS

| | | |
|---|---|---|
| DE | 197 18 269 A1 | 11/1998 |
| DE | 197 43 882 A1 | 4/1999 |
| DE | 198 29 052 C1 | 12/1999 |
| EP | 0 957 051 A1 | 11/1999 |
| EP | 1 043 830 B1 | 6/2004 |
| GB | 2 165 515 A | 4/1986 |
| WO | WO 00/01059 A1 | 1/2000 |
| WO | WO 2004/011351 A2 | 2/2004 |
| WO | WO 2006/040098 A1 | 4/2006 |

* cited by examiner

SORTING SYSTEM WITH LINEAR SYNCHRONOUS MOTOR DRIVE

CROSS REFERENCE TO RELATED APPLICATIONS

This application is a continuation of and claims the benefit and priority to U.S. patent application Ser. No. 12/595,473, filed on Mar. 2, 2010, now U.S. Pat. No. 8,210,343, which is a U.S. National Phase application of PCT International Application Number PCT/DK2008/050087, filed on Apr. 16, 2008, designating the United States of America and published in the English language, which is an International Application of and claims the benefit of priority to Danish Patent Application No. PA 2007 00553, filed on Apr. 16, 2007, and Danish Patent Application No. PA 2007 01807, filed on Dec. 18, 2007. The disclosures of the above-referenced applications are hereby expressly incorporated by reference in their entireties.

BACKGROUND OF THE INVENTION

1. Field of the Invention

The present invention relates to a sorting system including a conveyor comprising a plurality of carts for carrying articles, in particular for sorting articles such as parcels and baggage. The conveyor has an electric linear synchronous motor drive system.

2. Description of the Related Art

Automatic sorting of articles, such as baggage, packets and parcels and the like has in recent years become increasingly advantageous. Most national and international parcel delivery services and mail services today operate large distribution centers wherein automatic or semiautomatic sorting of parcels according to their destination is performed. Similarly, many baggage handling systems, such as for example for airports, use automatic sorting systems. An important part of such baggage handling or parcel sorting centers is a conveyor for automatically moving the articles to the desired location in the distribution centre appropriate for the given destination.

Sorting systems typically have a number of carts/article supporting units driven by a transport mechanism. An article in the form of e.g. a parcel or baggage is placed on a cart and driven round a track by the transport mechanism. When the article reaches the appropriate location for the given destination, the article is loaded off the track. Typically, the loading of the article on and off the cart is automatic, for example by moving an article supporting surface in a direction perpendicular to the conveying direction or by a tipping motion by the platform/article supporting surface supporting the article.

One such sorting system is known from WO 2004/011351, which has a number of carts moving along a track. A propulsion system for the conveyor comprises a stationary stator which has a coil assembly. In addition the carts have a reaction element comprising a plurality of permanent magnets mounted on a ferromagnetic carrier plate thereby providing magnetic fields. A controller controls the supply of electrical power to the coil assembly such that a travelling-wave magnetic field is generated which interacts with those of the permanent magnets to provide a driving force.

Another known system having a magnetic drive system is shown in U.S. Pat. No. 4,792,036. It relates to a transporting device of the conveyor belt type in which a transporting belt, on which the material to be transported can be supported, is capable of being moved along a transport path by a driving mechanism and carried using rolling bodies. The transport path is equipped with an electrical travelling-wave stator. Permanent magnets are arranged in series which interact with the transporting belt in a power-transmitting fashion and form a linear motor with the travelling-wave stator with an air-gap between the pole faces of the attracting permanent magnets and the travelling-wave stator.

SUMMARY OF THE INVENTION

It is an object of the present invention to provide an improved sorting system. A second object is to provide a sorting system with improved energy utilization and efficiency having the benefit of reduced energy consumption. Other objects appear from the description and the appended figures.

One aspect of the invention involves a sorting system including a conveyor comprising a plurality of carts for carrying articles, a track along which the carts may be driven, a propulsion system for providing a driving force to the carts for moving the carts along the track, said propulsion system comprising at least one stationary stator having a plurality of coils arranged to generate magnetic fields when electrical power is applied, and reaction elements mounted on each of the carts, said reaction elements each comprising a plurality of permanent magnets connected to at least one plate-like carrier, and said reaction elements being arranged on the carts in order to interact with the magnetic fields generated by the coils of the stator, as well as a controller for controlling a supply of electrical power to the stator in order to provide a driving force via the reaction elements to the carts when power is applied, where the reaction elements each comprises an uneven number of permanent magnets arranged with alternating polarity and with an equal pitch from magnet to magnet, and where the coils of the stator are arranged with a pitch from coil to coil equal to the pitch from magnet to magnet on the reaction element, and where each cart is linked to an adjacent cart, and where the magnets on reaction elements of two adjacent carts are arranged to form a row of magnets with constant pitch and alternating polarity, said row having an only interruption where one magnet is absent, said interruption being located by a transition between said two adjacent carts.

The reaction elements on adjacent carts are hence arranged as one almost continuous reaction element with a row of magnets with alternating polarity, which is interrupted only by a single magnet being absent or missing by the transition between the carts. Therefore, a maximum number of magnets are available on each cart, and in total, to interact with the travelling-wave magnetic fields. Moreover, use of the stationary stator or stators is optimized, because the travelling-wave magnetic fields may have a maximum number of coils interacting with the magnets. When controlling the travelling-wave magnetic field the controller only has to take the absent magnets at the transitions between the carts into account, or may even ignore the absent magnets. The travelling-wave magnetic fields may include alternating fields generated by all the coils of the stator. Or, where only a coil in question, which at the time is in a position where an absent magnet is situated, may at such time be turned off and not used. These factors lead to improved energy utilization and efficiency. As sorter systems typically operate continuously over long periods, this efficiency improvement results in significant cost saving.

The plate-like carriers may be arranged in a horizontal position on the carts and the at least one stationary stator may be arranged to interact with the reaction elements from a position below the reaction elements. This facilitates that the stators may be built into the track and placed out of the way.

The plate-like carriers may also be arranged in a vertical position on the carts and at least one stationary stator may be arranged to interact with the reaction elements from a position situated sideways to the reaction elements. This facilitates that the stators may be built into the side of the track.

The plate-like carriers may further be arranged in a vertical position on the carts and at least two stationary stators may be arranged to interact with the reaction elements from opposite positions situated sideways to the reaction elements. This is preferred to having the stators interact with the reaction element from one side only, due to the induced sideway forces. However, care must be taken to ensure that undesired objects are not trapped between the oppositely arranged stators, which may cause a system failure.

The plate-like carrier may comprise ferromagnetic material which is arranged to lead a magnetic field from at least one permanent magnet to another permanent magnet. This may depend on the actual arrangement of the magnets on the carrier relative to the stators to improve the energy efficiency since the magnetic field is lead with a more reduced loss through ferromagnetic material than through air. The plate-like carrier may be made from an iron or steel plate.

A preferred embodiment involves that the surface of the permanent magnets has an extent of from 40 to less than 50 millimeters in a longitudinal direction of the cart. The magnets may be arranged with a pitch of 50 millimeters or about 50 millimeters. Any other magnet to magnet pitches may also be chosen, e.g. 25, 40, 45, 55, 60, 75 or 100 millimeters, as long as the magnet to magnet pitch is the same on each cart. The extent of the magnets shall preferably correspond to the pitch or slightly less in order to maximize the strength of the magnetic fields.

Another preferred embodiment involves that a cart to cart pitch of consecutive carts is a natural number of hundreds of millimeters. This works very well with a pitch from magnet to magnet in the reaction elements of about 50 millimeters. A natural number of hundreds of millimeters is convenient for adapting the size of the carts to the articles which are to be sorted. The pitch of consecutive carts is preferably selected from a group comprising 200, 300, 400, 500, 600, 700, 800, 900, 1000, 1100, 1200, 1300, 1400, 1500, 1600, 1700, 1800, 1900 and 2000 millimeters, which covers typical articles which are sorted, such as parcels and luggage. With a magnet to magnet pitch different from 50 millimeters may a different cart to cart pitch be selected accordingly.

The carts may preferably form an endless chain of carts. For an endless chain, the driving forces can be applied to any suitable carts and there is no need for special consideration of the beginning or end of a succession of carts. Stators may be arranged in suitable positions along the track. When the carts form an endless chain, it is possible to make the sorter system with only one stator. However, in order to enable a more smooth and constant propulsion, it is preferred to use a plurality of stators arranged along the track.

In a further embodiment of the system the controller may comprise an encoder for determining a position and a speed of one or more carts, or one of a train of carts, or one of an endless chain of carts. The controller may control the electrical power applied to the coil assembly in response to the determined position and/or speed. Preferably, the encoder is placed in connection with a stator such that when a position and/or a speed of a cart is detected, this is used to synchronize the travelling-wave magnetic field of the stator with the magnetic fields of the permanent magnets. Specifically, the location determination can be used to set a phase of the frequency of the electrical supply creating the travelling-wave magnetic field, and the speed can be used to set the frequency of the electrical supply creating the travelling-wave magnetic field.

When in accordance with a further embodiment, the reaction elements of the system each comprises a number of permanent magnets arranged with alternating polarity, and where the magnets on reaction elements of two adjacent carts are arranged to form a longitudinal row of magnets as seen in a transport direction of the carts, said row having two neighboring magnets and at least one of said two magnets is having, in the transport direction, a reduced dimension compared to other magnets of the reaction element, said two neighboring magnets being located at each side of the transition between said two adjacent carts, a possible advantage is that the reaction elements on adjacent carts are arranged as one almost continuous reaction element with a row of magnets with alternating polarity. This row is interrupted only by at least one of two neighboring magnets having a reduced dimension in the transport direction at each side of the transition between the carts and by the absent magnet.

Another aspect of the invention involves a cart for a sorting system, the cart comprising a frame structure, at least one magnetic reaction element comprising an uneven and plural number of permanent magnets mounted equidistantly on a at least one plate-like carrier, where the cart comprises linking means for connection to another cart, and where the reaction element, when the cart is connected to an identical cart to form two adjacent carts, the magnets on the reaction elements of said two adjacent carts are forming a row of magnets with constant pitch and alternating polarity, said row having an only interruption where one magnet is absent, said interruption being located by a transition between said two adjacent carts.

BRIEF DESCRIPTION OF THE DRAWINGS

FIGS. 8a-12b shows different embodiments of the magnets;

DETAILED DESCRIPTION OF THE PREFERRED EMBODIMENT

The figures are merely included as information given as examples to a skilled person of how the invention may be carried out.

Figure 1:
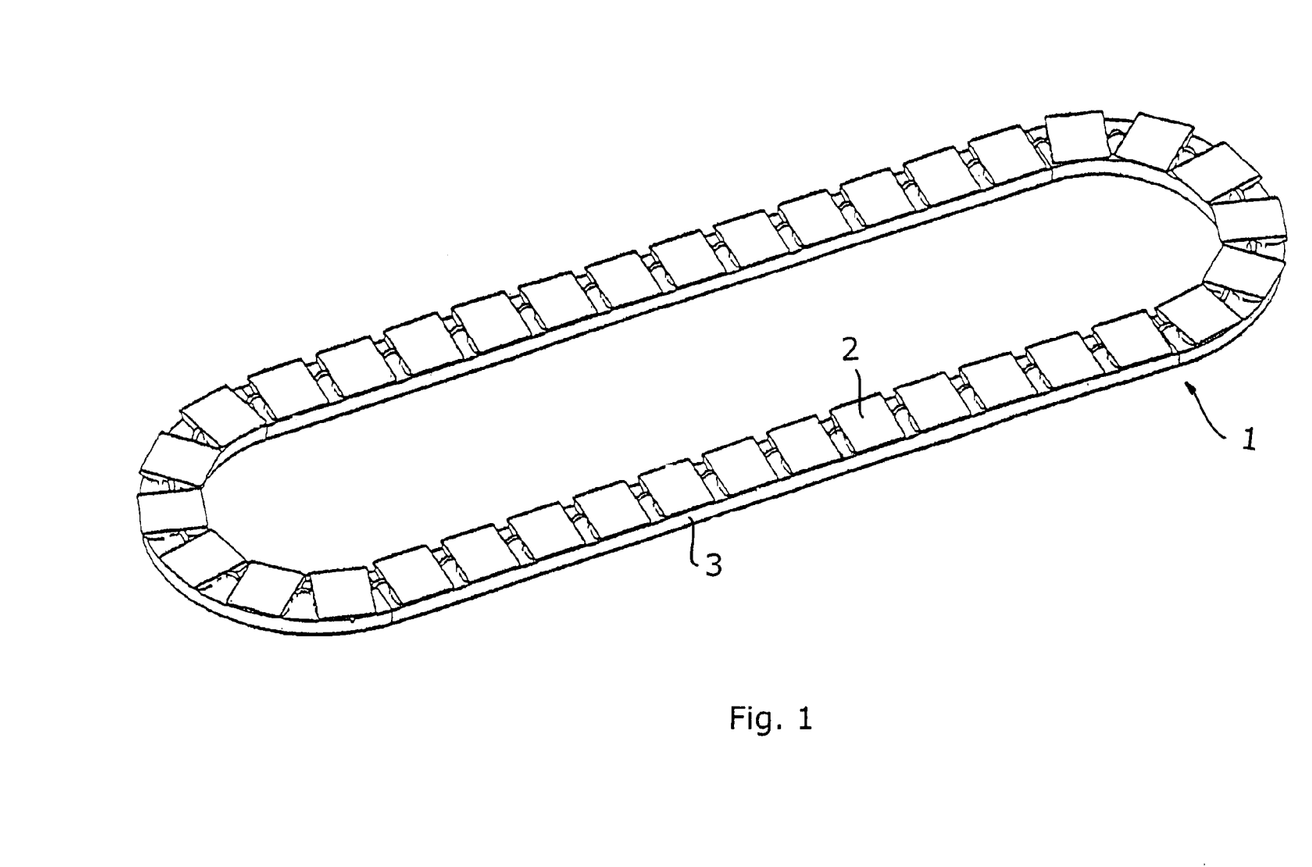
FIG. 1 shows a generalized depiction of a sorter system.

FIG. 1 displays a sorter system 1 which is suitable for carrying loads. The sorter system 1 comprises a track 3 along which the carts 2 move. The track 3 is shown as an oval track in FIG. 1, but in various embodiments it will be laid out to suit the local conditions and requirements. It may be kilometers long and include a number of turns, which may be both sideways as well as upwards and downwards. Along the track 3 is placed not shown induction stations for loading articles onto the carts as well as not shown discharge stations where loaded articles are discharged. A number of carts 2 move along the track for transporting articles from the not shown induction stations to the discharge stations. Each of the carts 2 has a load bearing platform on which an article to be transported is placed. The load bearing platform may be of any of the known types, such as cross-belt or tilt tray, or any other type.

Figures 3A, 3B:
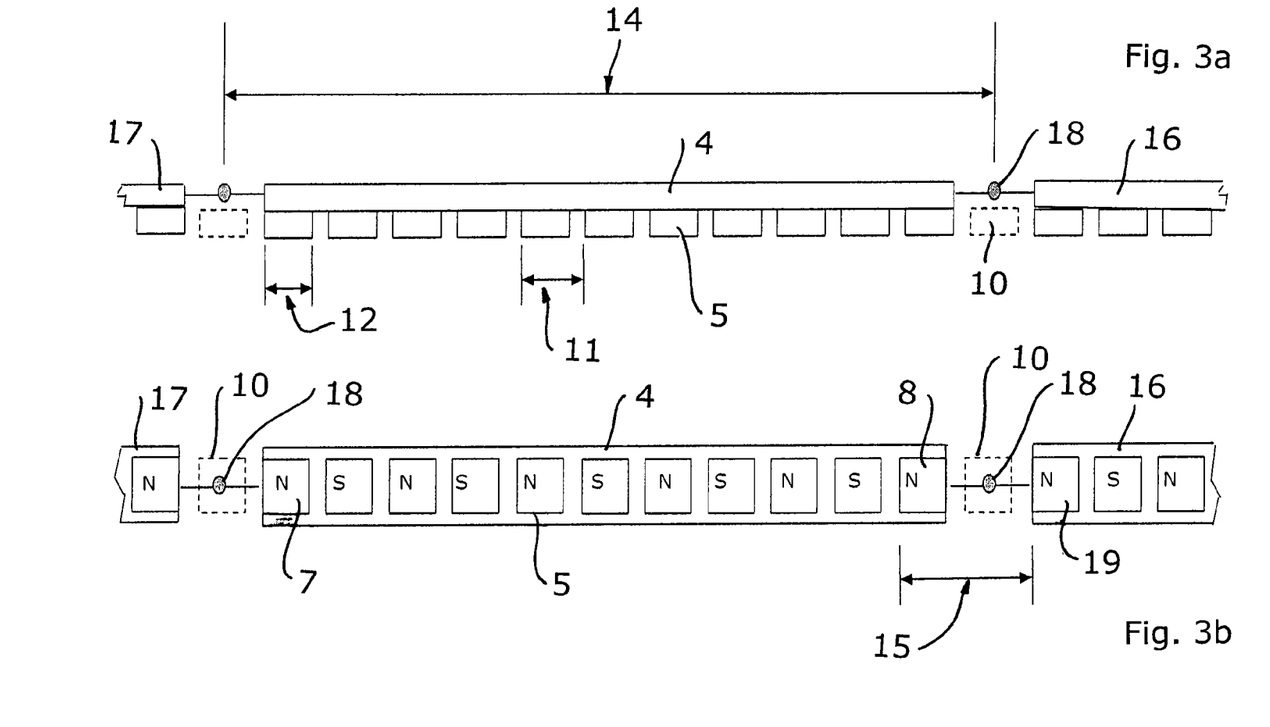
FIG. 3a shows a simplified representation of reaction elements on adjacent carts seen in a side view.
FIG. 3b shows a simplified representation of reaction elements on adjacent carts seen from below.

The carts 2 are interconnected by linking means 18 shown in FIGS. 3*a* and 3*b*, which is maintaining a fixed distance between the carts 2, and ensuring that the movement of a cart 2 is transferred to an adjacent cart by a pulling or pushing action. The carts 2 may form a train including two, three, four or five carts, or dozens of carts, or any number of carts. Or, as shown in FIG. 1, the carts 2 may form an endless chain covering the entire length of the track 3.

The sorting system according to the invention may be used as a parcel sorting system for a parcel distribution centre, and the loads carried by the conveyor are parcels of different sizes and weights. In another embodiment it may be used in a baggage handling system, and the loads carried are baggage, such as suitcases. Also, the sorting system may be used for distribution of articles in a ware house. The articles, baggage or parcels are automatically loaded to the load bearing platforms of the carts by e.g. a suitable conveyor belt or lifting apparatus. They are then transported to the appropriate location along the track where the article, baggage or parcel is automatically unloaded from the load bearing platform of the cart 2.

Figure 2:
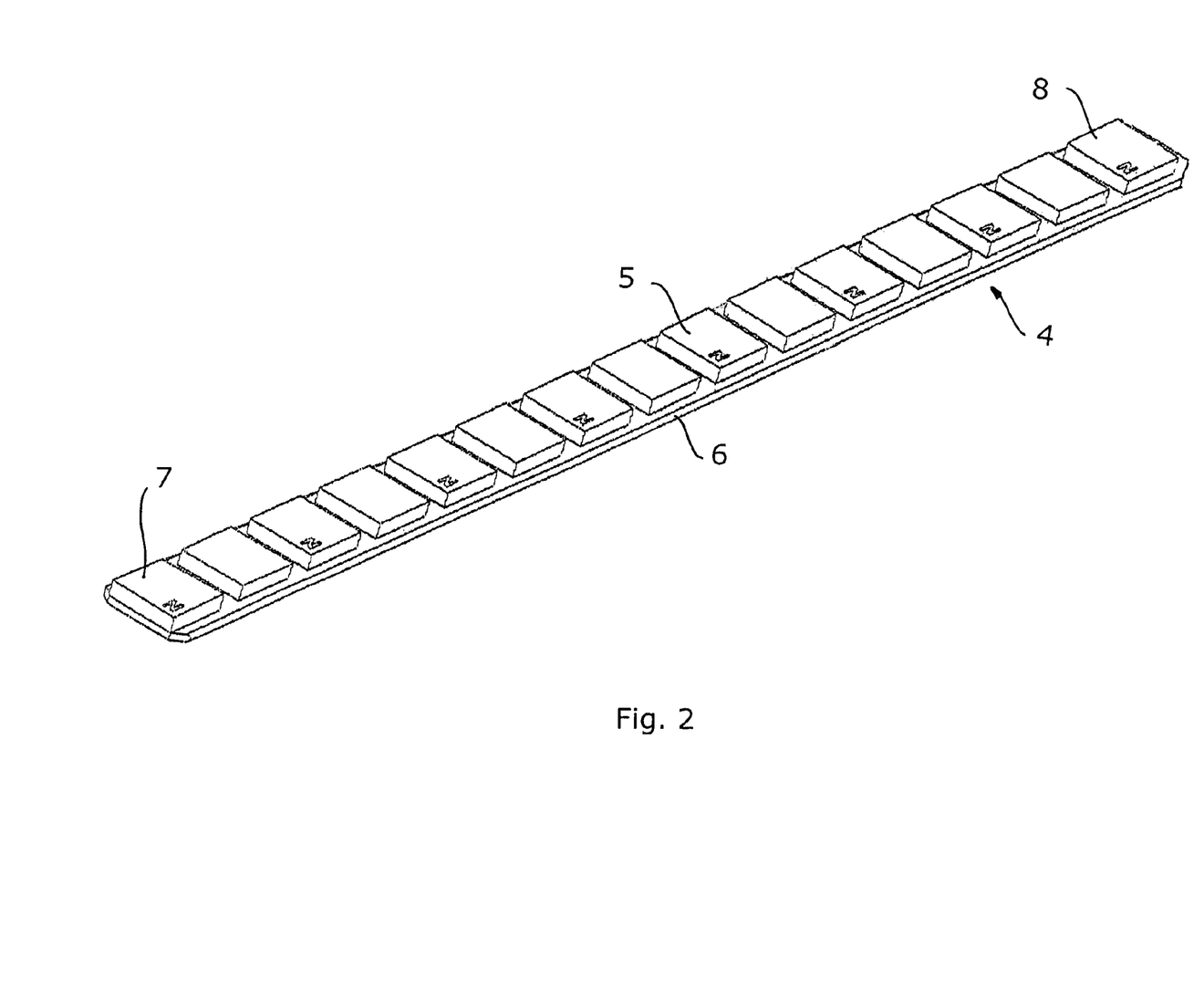
FIG. 2 shows a magnetic reaction element according to the invention.

FIG. 2 illustrates a view of a reaction element 4 in accordance with an embodiment of the invention. The reaction element 4 comprises a plate-like carrier 6 on which is fixed a plurality of permanent magnets 5. The plate 6 may be divided into sections for easier handling, or so as to divide the reaction element into modules. The permanent magnets 5 are arranged with alternating polarity. In FIG. 2 the permanent magnet 7 has in one end of the reaction element, and the permanent magnet 8 in the opposite end, a magnetic north pole facing upwards. The number of magnets 5 is uneven, such as 3, 5, 7, 9, 11, etc. The uneven number of permanent magnets of a reaction element from one end of said reaction element starts and ends with a magnetic north pole, but may as well start and end with a magnetic south pole. However, reaction elements on two adjacent carts must start and end with magnets having identical polarity.

FIGS. 3*a* and 3*b* display three consecutive magnetic reaction elements 4, 16 and 17 belonging to three consecutive carts. Linking means 18 are indicated just to illustrate that the carts are connected. The linking means 18 would normally not connect the carts by connecting the reaction elements, but instead connect one end of a cart with an end of an adjacent cart. The magnets 5 are arranged with a pitch 11 from magnet to magnet.

In a preferred embodiment of the system the magnets on the reaction elements are arranged with a pitch 11 from magnet to magnet of 50 millimeters. This pitch is particularly suitable for use with a sorter system, because the pitch of the carts is usually a plurality of hundreds of millimeters which is conveniently divided by 50 and results in a natural number. Another preferred embodiment involves that a surface of the permanent magnets, which is facing the stators, is substantially quadratic. The surface of the permanent magnets has an extent 12 of from 40 to less than 50 millimeters in a longitudinal direction of the cart.

The reaction elements 4, 16, 17 are attached to the carts. The plate-like carrier 6 may be arranged in a horizontal position on the carts and at least one not shown stationary stator may be arranged to interact with the reaction elements from a position below the reaction elements when the stator and reaction elements are interacting to propel the carts. Alternatively, the carrier 6 may be arranged in a vertical position on the carts. One or more not shown stationary stators may be arranged to interact with the reaction elements from positions situated sideways to said reaction elements when the stators and the reaction elements are interacting. Preferably, the stators are arranged in pairs acting from opposite side in order to counterbalance forces induced on the reaction elements.

The uneven number of permanent magnets 5 on the reaction element 4 is in FIG. 3*b* illustrated as starting with a magnetic north pole at the first magnet 7 and ending with a magnetic north pole at the last magnet 8. The first magnet 19 on an adjacent reaction element 16 belonging to a not shown adjacent cart has the same polarity as the last magnet 8 on the reaction element 4. The distance 15 is chosen as twice the magnet to magnet pitch 11 in order that the magnets 5 of the adjacent reaction elements 4, 16 form a row with alternating polarity and constant pitch from magnet to magnet. A magnet is absent in the row at the transition between the carts by the position indicated in dotted lines and designated reference number 10, where a magnetic south pole could have been present. A maximum number of coils in the not shown stator may thereby be active at the same time to interact with the magnets 5

A cart to cart pitch 14 is indicated in FIG. 3*a*. The cart to cart pitch of consecutive carts is preferably a natural number of hundreds of millimeters, such as 200, 300, 400, 500, 600, 700, 800, 900, 1000, 1100, 1200, 1300, 1400, 1500, 1600, 1700, 1800, 1900 and/or 2000 millimeters. When the magnet to magnet pitch 11 is selected as 50 millimeters and the cart to cart pitch 11 is chosen as a natural number of hundreds of millimeters this combination may always result in an uneven number of permanent magnets on each reaction element, which suits the entire length of the cart whereby two adjacent carts can have reaction elements with magnets 5 forming a row of magnets with alternating polarity and constant pitch from magnet to magnet, where the row has an interruption only at the transition between the adjacent carts.

When the magnets 5 on reaction elements on adjacent or consecutive carts have identically alternating polarities, i.e. either starting and ending with a magnetic north pole or starting and ending with a magnetic south pole, the magnets may be arranged to form a continuing row of alternating polarities, said row having an interruption where a magnet 10 is absent. The result is that the carts may be identical or even have a different cart to cart pitch 14, because the number of magnets on the reaction element is uneven whereby the row may be interrupted by only one absent magnet. Any other uneven number of magnets could also be chosen, e.g. three, but this would result in decreased energy efficiency since the travelling-wave magnetic fields generated by a stator would then have three coils at a time not interacting with a magnet.

FIGS. 4-7 display different embodiments of reaction elements 4 including a carrier 6 and permanent magnets 5 arranged with alternating polarity.

Figure 4:
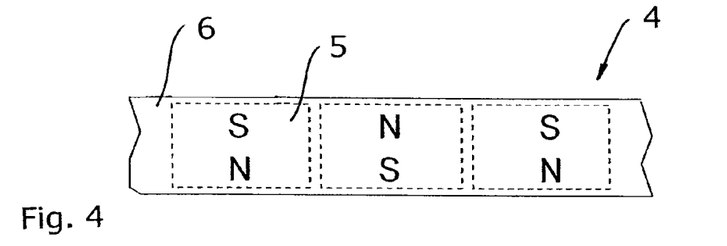
FIGS. 4-7 shows different embodiments of reaction elements.

FIG. 4 displays a variant where the magnets 5 are embedded in the carrier 6. The carrier 6 may be of plastic and the magnets embedded by casting the plastic around the magnets. Or the carrier 6 may be of aluminum where suitable recesses have been provided for receiving the magnets 5, which may be fastened with glue, or with mechanic fastening means.

Figure 5:
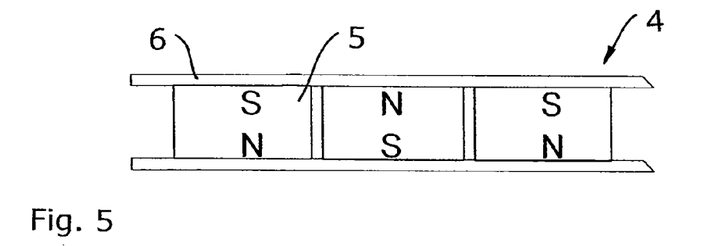

FIG. 5 displays a variant where the magnets 5 are fastened with glue between two thin plates of non-ferromagnetic material, e.g. aluminum.

Figure 6:
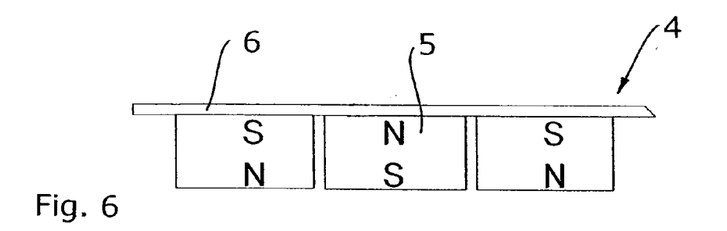

FIG. 6 displays a variant corresponding to FIG. 2 where the magnets 5 are attached to a carrier 6, where the carrier is a ferromagnetic plate.

Figure 7:
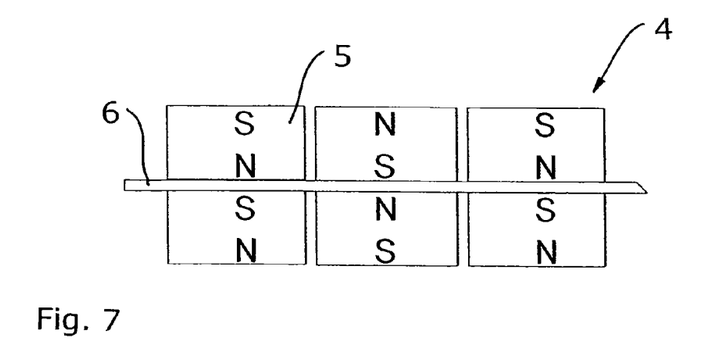

FIG. 7 displays a variant, where the carrier 6 is a ferromagnetic plate which has magnets 5 attached on both sides.

The reaction elements shown in FIGS. 4-6 may be used in more ways. One way involves that the reaction elements are arranged with the plate-like carrier in a horizontal position on the carts, i.e. that the figures are regarded as the reaction elements are viewed from the side and a not shown stationary stator is arranged to interact with the reaction elements from a position below the reaction elements. A plane going through the not shown stator and a reaction element 4 will then be essentially vertical. Another way involves that the plate-like carrier 6 is arranged in a vertical position on the carts, i.e. that the figures are regarded as the reaction elements 4 are viewed from above and a not shown stationary stator is arranged to interact with the reaction elements from a position at one side of the reaction elements. A plane through the not shown stator and a reaction element will in that situation be essentially horizontal. In this situation may the reaction elements 4 shown in FIGS. 4 and 5 also be interacting with two not shown stators which are placed on opposite sides of the reaction elements 4, i.e. such that both stators and a reaction element will lie in a same horizontal plane.

The embodiment of a reaction element 4 shown in FIG. 7 is to be viewed as the plate-like carrier 6 is arranged in a vertical position on the carts, i.e. that the figure is regarded as the reaction element 4 is viewed from above and that two not shown stationary stators will be arranged to interact with the reaction element from positions on each side of the reaction element. A plane through the not shown stators and the reaction element will in that situation be essentially horizontal.

Figure 8A:
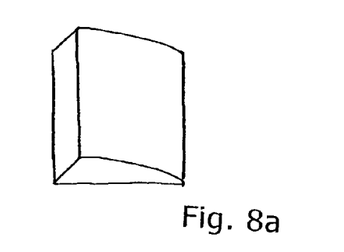
Figure 8B:
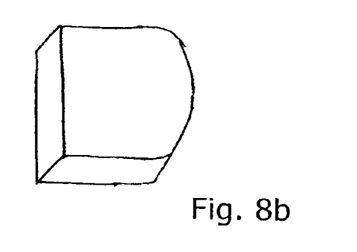

FIG. 8a shows an embodiment of a magnet 5 having an oval curvature along at least part of the entire surface of the magnet. FIG. 8b shows another embodiment of a magnet 5 having an oval curvature along at least part of the circumference of the magnet.

Figure 9A:
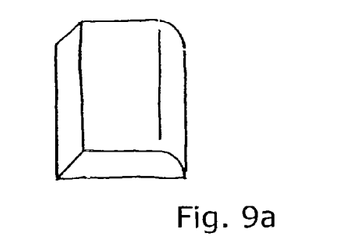
Figure 9B:
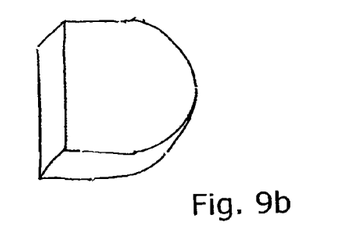

FIG. 9a shows another embodiment of a magnet 5 having an at least partly circular curvature along at least part of the entire surface of the magnet. FIG. 9b shows another embodiment of a magnet 5 having an at least partly circular, such as a semi-circular curvature, along at least part of a circumference of the magnet 5.

Figure 10A:
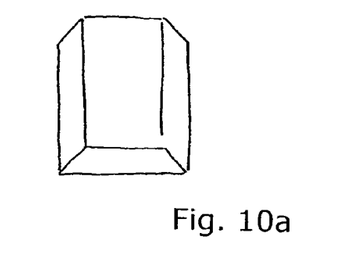
Figure 10B:
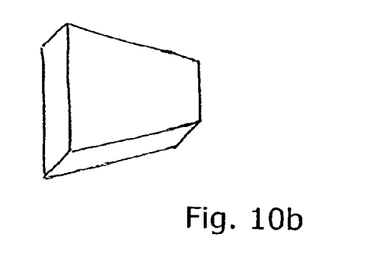

FIG. 10a shows another embodiment of a magnet 5 having a tapering shape along at least part of the entire surface of the magnet. FIG. 10b shows another embodiment of a magnet 5 having a tapering shape along at least part of a circumference of the magnet.

Figure 11A:
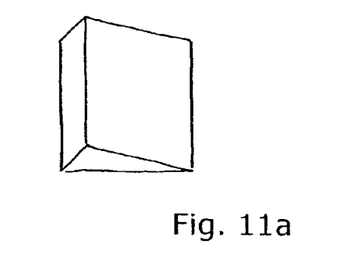
Figure 11B:
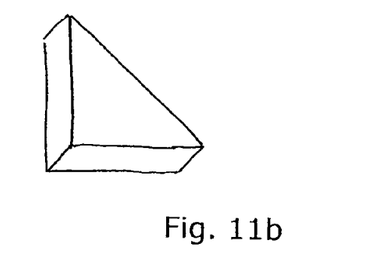

FIG. 11a shows another embodiment of a magnet 5 having a wedge-like shape along at least part of the entire surface of the magnet 5. FIG. 11b shows another embodiment of a magnet 5 having a wedge-like shape along at least part of a circumference of the magnet.

Figure 12A:
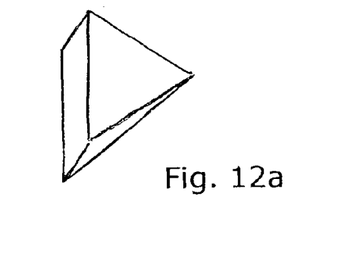
Figure 12B:
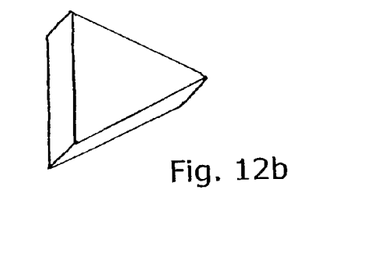

FIG. 12a shows another embodiment of a magnet 5 having a point-like shape along at least part of the entire surface of the magnet. FIG. 12b shows another embodiment of a magnet having a point-like shape along at least part of a circumference of the magnet.

The various shapes of the magnets described for FIG. 8a to FIG. 12b may be used for three or more of the magnets on each reaction element, but the magnets could in particular be useful for providing magnets with a reduced dimension compared to other magnets of the reaction element, and especially for providing two neighboring magnets located at each side of the transition between two adjacent carts.

Furthermore, by providing the magnets with the above described shapes provides magnets with reduced dimensions in some directions or planes, compared to e.g. a cubic magnet having the same unreduced dimension in one or more directions. A magnet with such reduced dimensions, and e.g. provided in one of the above described shapes will normally provide a reduced magnetic flux or magnetic field when compared to a cubic magnet having non-reduced dimension and being magnified to the same extend and having the same material characteristics as the magnet with the reduced dimensions.

It is to be understood that the invention as disclosed in the description and in the figures may be modified and changed and still be within the scope of the invention as claimed hereinafter.

What is claimed is:

1. A sorting system including a conveyor comprising a plurality of carts for carrying articles, a track along which the carts may be driven, a propulsion system for providing a driving force to the carts for moving the carts along the track, said propulsion system comprising at least one stationary stator having a plurality of coils arranged to generate magnetic fields when electrical power is applied, and reaction elements mounted on each of the carts, said reaction elements each comprising a plurality of permanent magnets connected to at least one plate-like carrier, and said reactions elements being arranged on the carts in order to interact with the magnetic fields generated by the coils of the stator, as well as a controller for controlling a supply of electrical power to the stator in order to provide a driving force via the reaction elements to the carts when power is applied, where the reaction elements each comprises a number of permanent magnets arranged with alternating polarity and with an equal pitch from magnet to magnet, and where the coils of the stator are arranged with a pitch from coil to coil equal to the pitch from magnet to magnet on the reaction element, and where each cart is linked to an adjacent cart, and where the magnets on reaction elements of two adjacent carts are arranged to form a row of magnets with constant pitch and alternating polarity, said row having an only interruption where one magnet is absent, said interruption being located by a transition between said two adjacent carts.

2. The sorting system according to claim 1, wherein a polarity of a first magnet of one reaction element has the same polarity as a first magnet of a consecutive reaction element.

3. The sorting system according to claim 1, wherein a polarity of a last magnet of one reaction element has the same polarity as a last magnet of a consecutive reaction element.

4. The sorting system according to claim 1, wherein each plate-like carrier is arranged in a horizontal position on the carts and the at least one stationary stator is arranged to interact with the reaction elements from a position below said reaction elements when the stator and reaction elements are interacting.

5. The sorting system according to claim 1, wherein each plate-like carrier is arranged in a vertical position on the carts and at least one stationary stator is arranged to interact with the reaction elements from a position situated sideways to said reaction elements when the stator and the reaction elements are interacting.

6. The sorting system according to claim 1, wherein each plate-like carrier is arranged in a vertical position on the carts and at least two stationary stators are arranged to interact with the reaction elements from opposite positions situated sideways to said reaction elements when the stators and the reaction elements are interacting.

7. The sorting system according to claim 1, wherein the plate-like carrier comprises ferromagnetic material, which is arranged to lead a magnetic field from at least one permanent magnet to another permanent magnet.

8. The sorting system according to claim 1, wherein the surface of the permanent magnets has an extent of from 40 to less than 50 millimeters in a longitudinal direction of the cart.

9. The sorting system according to claim 1, wherein a cart to cart pitch of consecutive carts is a natural number of hundreds of millimeters.

10. The sorting system according to claim 1, wherein a cart to cart pitch of consecutive carts is selected from a group comprising 200, 300, 400, 500, 600, 700, 800, 900, 1000, 1100, 1200, 1300, 1400, 1500, 1600, 1700, 1800, 1900 and 2000 millimeters.

11. The sorting system according to claim 1, wherein the reaction elements each comprises an even number of permanent magnets.

12. The sorting system according to claim 1, wherein the plurality of carts has a cart to cart pitch of consecutive carts of 600 millimeters, a magnet to magnet pitch of 50 millimeters and 11 permanent magnets on each of the reaction elements of the plurality of carts.

13. The sorting system according to claim 1, wherein the plurality of carts has a cart to cart pitch of consecutive carts of 1200 millimeters, a magnet to magnet pitch of 50 millimeters and 22 permanent magnets on each of the reaction elements of the plurality of carts.

14. The sorting system according to claim 1, wherein the pitch from magnet to magnet is chosen as 25, 40, 45, 50, 55, 60, 75, 100 or about 50 millimeters.

15. The sorting system according to claim 1, wherein an extent of the magnets in a longitudinal direction of the cart correspond to the magnet to magnet pitch or slightly less than the magnet to magnet pitch.

16. The sorting system according to claim 1, wherein the carts form an endless chain of carts.

17. The sorting system according to claim 1, wherein a plurality of stators are arranged along the track.

18. The sorting system according to claim 1, wherein the controller further comprises an encoder for determining a position and a speed of one or more carts, and the controller is operable to control the electrical power applied to the stator in response to the determined position and speed.

19. The sorting system according to claim 1, wherein the reaction elements each comprises a number of permanent magnets arranged with alternating polarity, and wherein the magnets on reaction elements of two adjacent carts are arranged to form a longitudinal row of magnets as seen in a transport direction of the carts, said row having two neighboring magnets, at least one of said two magnets having, in the transport direction, a reduced dimension compared to other magnets of the reaction element, said two neighboring magnets being located at each side of the transition between said two adjacent carts.

20. The cart according to claim 19, wherein a polarity of a first magnet of one reaction element has the same polarity as a first magnet of a consecutive reaction element.

21. A cart for a sorting system according to claim 1, wherein the cart comprises a frame structure, at least one magnetic reaction element comprising a plurality of permanent magnets mounted equidistantly on at least one plate-like carrier, wherein the cart comprises a linking means for connection to another cart, and, when the cart is connected to an identical cart to form two adjacent carts, the magnets on the reaction elements of said two adjacent carts form a row of magnets with constant pitch and alternating polarity, said row having an only interruption where one magnet is absent, said interruption being located by a transition between said two adjacent carts.

* * * * *